US009221240B2

(12) United States Patent
Reutelingsperger et al.

(10) Patent No.: US 9,221,240 B2
(45) Date of Patent: Dec. 29, 2015

(54) METHOD FOR PROVIDING A TEXTILE PRODUCT, THE PRODUCT ITSELF AND USES THEREOF

(75) Inventors: Christiaan Mathias Hubertus Gerard Reutelingsperger, Arcen (NL); Tzanko Kaloyanov Tzanov, Terrassa Barcelona (ES); Carlos Díaz Blanco, Centelles (ES)

(73) Assignee: ERUTAN BV, Grubbenvorst (NL)

( * ) Notice: Subject to any disclaimer, the term of this patent is extended or adjusted under 35 U.S.C. 154(b) by 516 days.

(21) Appl. No.: 13/805,007

(22) PCT Filed: Jun. 29, 2011

(86) PCT No.: PCT/EP2011/060972
§ 371 (c)(1),
(2), (4) Date: Dec. 18, 2012

(87) PCT Pub. No.: WO2012/001085
PCT Pub. Date: Jan. 5, 2012

(65) Prior Publication Data
US 2013/0095312 A1 Apr. 18, 2013

(30) Foreign Application Priority Data

| Jun. 30, 2010 | (EP) | 10168032 |
| Jun. 30, 2010 | (EP) | 10168033 |
| Jan. 29, 2011 | (EP) | 11152629 |
| Feb. 16, 2011 | (EP) | 11154741 |

(51) Int. Cl.

| A01G 1/00 | (2006.01) |
| B32B 37/14 | (2006.01) |
| D06M 16/00 | (2006.01) |
| D06M 17/00 | (2006.01) |
| D06N 7/00 | (2006.01) |
| A01G 9/10 | (2006.01) |
| D06M 13/123 | (2006.01) |
| D06M 13/148 | (2006.01) |
| D06M 15/01 | (2006.01) |

(52) U.S. Cl.
CPC ........... *B32B 37/14* (2013.01); *A01G 1/001* (2013.01); *A01G 9/1086* (2013.01); *D06M 13/123* (2013.01); *D06M 13/148* (2013.01); *D06M 15/01* (2013.01); *D06M 16/003* (2013.01); *D06M 17/00* (2013.01); *D06N 7/0065* (2013.01); *D06N 7/0068* (2013.01); *D06N 7/0071* (2013.01); *D06N 2201/042* (2013.01); *D06N 2201/045* (2013.01); *D06N 2201/06* (2013.01); *Y10T 428/249921* (2015.04)

(58) Field of Classification Search
CPC .................................. B32B 37/14; A01G 1/001
USPC ................... 428/221; 156/166, 91; 47/58.1 R
See application file for complete search history.

(56) References Cited

U.S. PATENT DOCUMENTS

| 2006/0257616 A1* | 11/2006 | Hendrix et al. ............. 428/85 |
| 2007/0079547 A1 | 4/2007 | Gold |
| 2009/0062516 A1* | 3/2009 | Belanger et al. ............. 530/502 |
| 2010/0260966 A1 | 10/2010 | McGill |
| 2011/0159768 A1* | 6/2011 | Crescimanno et al. ....... 442/327 |

FOREIGN PATENT DOCUMENTS

| DE | 29720639 U1 | 2/1998 |
| EP | 0837170 A2 | 4/1998 |
| EP | 2189489 A1 * | 5/2010 |
| WO | 93/07790 | 4/1993 |
| WO | 2007/127222 A1 | 11/2007 |
| WO | 2008/029075 A1 | 3/2008 |

OTHER PUBLICATIONS

ROMPP Online, Stichwort: Lignin, Version 3.16 (Mar. 2002).
McNeil, Steven J. et al., Closed-loop Wool Carpet Recycling, Resources Conservation & Recycling, vol. 51, No. 1, May 10, 2007, pp. 220-224.
Hossain, Kh. M. Gaffar et al., Enzyme-mediated Coupling of a Bi-functional Phenolic Compound onto Wool to Enhance Its Physical, Mechanical and Functional Properties, Enzyme and Microbial Technology, vol. 46, (Jan. 1, 2010), 326-330.
Hossain, Kh. M. Gaffar et al., Multifunctional Modification of Wool Using an Enzymatic Process in Aqueous-organic Media, Journal of Biotechnology, vol. 141 (Jan. 1, 2009), pp. 58-63.
Aktas, Nahit et al., Kinetics of Lactase-catalzyed Oxidative Polymerization of Catechol, Journal of Molecular Catalysis B: Enzymatic 22 (2003), 61-69.
Blanco, Carlos Diaz et al., Dyeing Properties, Synthesis, Isolation and Characterizatoin of an In Situ Generated Phenolic Pigment, Covalently Bound to Cotton, Enzyme and Microbial Technology, vol. 44 (Jun. 2009), pp. 380-385.
Wrzesniewska-Tosik, Krystyna et al., Novel Biocomposites with Feather Keratin, Fibres & Textiles in Eastern Europe, Jan./Dec. 2007, vol. 15, Nos. 5-6 ( 64-65) (Dec. 2007), pp. 157-162.

* cited by examiner

*Primary Examiner* — Daniel Lee
(74) *Attorney, Agent, or Firm* — Richard M. Goldberg

(57) ABSTRACT

A method for providing a textile product includes the steps of providing yarns, contacting the yarns with a support material to form an intermediate product and bonding the yarns to the support material to form the textile product, wherein the bonding takes place by providing a reactive nucleus precursor at a site where the yarns contact the support material, and converting the precursor into a compound having multiple reactive nuclei in the presence of a compound having multiple nucleophilic groups, as well as a textile product obtainable by the method, uses of that product and lignin for use in producing such a textile product.

17 Claims, No Drawings

METHOD FOR PROVIDING A TEXTILE PRODUCT, THE PRODUCT ITSELF AND USES THEREOF

FIELD OF THE INVENTION

The present invention pertains to a method for providing a textile product, in particular carpets or other floor and wall coverings, including the steps of providing yarns, contacting the yarns to a support material to form an intermediate product, and bonding the yarns to the support material to form the textile product. The invention also pertains to the resulting textile product

BACKGROUND OF THE INVENTION

Floor coverings such as rugs or carpets often consist of dyed pile yarns, a primary support material (also called "backing"), and in many cases a secondary backing that adds strength to the carpet. The yarns are usually contacted with the primary support material by a process called tufting, which is a type of textile weaving in which a thread is attached to the support material by mere insertion in that material. Such tufting does not provide adequate mechanical bonding between the yarns and the support material. Usually an adhesive is used to provide adequate mechanical bonding between the yarns and the primary and, if present, the secondary backings.

Ninety-seven percent of pile yarns today are made up of synthetic polymers. Synthetic polymers are for example nylon (which is in 66% of all carpet), acrylics (15%), polyester (less than 15%), polypropylene (less than 5%) and blends thereof. These pile yarns are dyed using a variety of organic chemical compounds, or occasionally, organometallic complexes. The backing is in most cases made of woven or non woven polypropylene. The adhesive used to bind the backings together is almost universally synthetic rubber latex.

Latex based floor coverings have several disadvantages. Firstly, since the latex is water-based, latex coverings tend to be non-resistant to moisture. They may allow moisture to pass through which on its turn can lead to the formation of mildew and molds. This cannot only degrade the floor covering, but may also lead to environmental hazards such as poor air quality. As a consequence, when latex based floor coverings are placed in an area where moisture is a concern, for example in lobbies, they may need to be frequently replaced. Secondly, because latex-based floor coverings use dissimilar materials for the yarns, the backing and the adhesive, such coverings cannot be fully recycled. Carpet recycling technologies have been developed but are expensive and do not allow complete recycling of the materials used, mainly due to the intense embedding of the yarns and backing in the vulcanized latex. As a result, most floor coverings are simply discarded, burned or shredded. At best, shredded floor coverings are used as landfills but since vulcanized latex is hardly biodegradable, the shredded remains will be present for many years.

In the art, several solutions have been proposed to overcome or at least mitigate the above described disadvantages. One solution is to replace the conventional latex adhesive with synthetic polymer adhesives such as polyolefines and polyurethanes. This is for example known from US 2010/0260966, which discloses a carpet tile that includes a face fabric having a top surface and a base, and a dimensionally stabilized non-woven cushion material having a stabilizing material incorporated therein. The non-woven cushion material is attached to the face fabric by using a synthetic polymer adhesive, in which adhesive the cushion material as well as the fabric are embedded for adequate bonding. Still, complete recycling of this known carpet tile is hardly possible due to the embedding of the face fabric and the cushion material in the polymer. At best, when worn, these carpets are shaven to release a (small) part of the pile yarns for recycling.

Another solution proposed is the use of hot melt adhesives. These adhesives are popular in conventional roll carpets since they are relatively inexpensive, readily available and can be recycled more easily. Hot melt adhesives are also used in carpet tiles, as is known for example from WO 2007/127222. Still, given the fact that the bonding of the face fabric with the backing when using a hot melt adhesive needs substantial embedding of the materials in this adhesive, complete recycling remains hard. Either the face fabric, the backing or both will inevitably be contaminated with substantial amounts of the adhesive.

Also, floor coverings based on biodegradable materials are commercially available. These floor coverings, mainly carpets, carpet tiles and rugs are in most cases based on a pile of yarns comprising keratin fibres (mainly wool), and a backing based on material comprising cellulose fibres such as jute. These floor coverings can be obtained for example from InterfaceFlor, Scherpenzeel and Desso, Waalwijk, both in The Netherlands. The fact that these floor coverings largely comprise materials of natural origin, which materials are additionally biodegradable, makes these carpets far more environmentally friendly. They can at least partly be recycled and the corresponding carbon dioxide emission is substantially less when compared to fully synthetic floor coverings. However, the adhesive used to bond the yarns to the backing, in most cases still latex, is not biodegradable.

SUMMARY OF THE INVENTION

It is an object of the invention to provide a textile product that overcomes or at least mitigates the disadvantages of known products. It is a further object to provide a textile product that allows a more complete recycling of the yarns and/or support material. To this end a textile product as described supra in the section "Field of the invention" has been devised, wherein the bonding takes place by providing a reactive nucleus precursor at a site where the yarns contact the support material, and converting the precursor into a compound having multiple reactive nuclei in the presence of a compound having multiple nucleophilic groups.

Applicant surprisingly found that a conventional binding component that needs substantial embedding of the yarns to provide adequate mechanical bonding strength can be dispensed with when an in situ polymerization process is used, based on the reaction between a reactive nucleus in the presence of nucleophilic groups. Apparently, in situ polymerisation inherently provides adequate interaction between the yarns and the support material to provide sufficient ultimate bonding strength. This may for example be due to the fact that the reactants, before undergoing polymerisation are easily spread throughout the contact region (given the fact that they are small molecules when compared to typical polymers with weights up to 100,000-400,000 g/mol) and thus provide good contact between the resulting polymer and the yarns and support material. Also, reactant molecules may simply be present in the yarns, support material, or both, for example by being dissolved, embedded, compounded or naturally present. Applicant recognised that it is important to prevent that a polymerisation reaction takes place before the intermediate product is established. Therefore, in the present method, it is a reactive nucleus precursor that is actually provided.

Such a precursor can be any chemical compound that can be converted into a compound having multiple (i.e. at least two) reactive nuclei, such compounds being commonly known and for example could be diphenols, aminophenols, (aromatic) diamines etc. The precursor may for example be applied to the intermediate product after its establishment. However, the precursor could also be present for example as a coating on the support material. In any case, by providing a precursor instead of the actual compound having the multiple reactive nuclei, it can be ensured that the actual polymerization reaction takes place in situ, i.e. at the site where the yarns contact the support material. The polymerization reaction can for example be triggered by applying a reactant to the intermediate product, which reactant converts the precursor into a compound having multiple reactive nuclei. A surprising finding of applicant was that there is no pressure and high temperature needed to actually constitute sufficient mechanical bonding strength between the yarns and the support when using an in situ polymerisation process. In the prior art various technologies are known for in situ polymerisation of reactive nuclei to bind fibres, such as for example in EP 2 189 489. In the known technologies however the binding takes place using high temperatures, (typically 180-220° C.) and high pressure (typically 5-10 atmosphere). Such circumstances would ruin a conventional textile product comprising either natural (typically wool, silk, hemp, ramie, jute) fibres or synthetic fibres (typically polypropylene, polyamide, poly lactic acid) or both. Not only can many of these materials typically not withstand such high temperatures without melting or degrading, the typical constitution of a textile product, viz. tufted or weaved yarns leading to a product with a soft hand, would transfer into a hard, compressed sheet like structure, not useable for the originally intended purpose. Therefore, in the art this type of binding has not been contemplated for producing a textile product.

The compound having the nucleophilic groups may be comprised in the yarns, support material or both, or may for example be added as an additional (external) component before or after the compound having the multiple reactive nuclei has been formed. However, this latter compound itself may also act as the compound having multiple nucleophilic groups. In any case, given the fact that when applying the present invention, a high degree of embedding of the yarns can be dispensed with, the yarns of worn carpet may be recycled more easily to a substantially higher rate when compared to prior art floor coverings.

The present invention can e.g. be advantageously used in connection with yarns and or a support material comprising biodegradable materials, such as biodegradable polymers. Such polymers will decompose in natural aerobic (e.g. composting) and/or anaerobic (e.g. landfill) environments. They may be composed of either biopolymers, which may be naturally produced polymers or polymers whose components are derived from renewable raw materials, but may also be petroleum-based, or a blend of one or more of these types of polymers. Most aliphatic polyesters are biodegradable due to their potentially hydrolysable ester bonds. Typical examples of naturally produced biodegradable polymers are polyhydroxyalkanoates (PHA's) like poly-3-hydroxybutyrate (PHB), polyhydroxyvalerate (PHV) and polyhydroxyhexanoate (PHH), and starch, cellulose, keratin and derivatives thereof. A biodegradable polymer from a renewable resource is for example polylactic acid (PLA). Examples of other synthetic biodegradable polymers are polybutylene succinate (PBS), polycaprolactone (PCL), polyvinylacetate (PVA) and cellulose esters like cellulose acetate, nitrocellulose and their derivates such as celluloid.

It is noted that in the present method it is essential that at a stage, the reactive nucleus precursor is present where the yarns contact the support material. For this, it is not essential that the precursor itself is actually provided. It may also be that one or more chemical substances that react to form the precursor are the compounds that are actually provided (e.g. by coating, immersing, spraying, blending, compounding etc.) to or in the yarns, support material and/or intermediate product. Also in these cases, the reactive nucleus precursor is ultimately provided (viz. through reaction) in the sense of the present invention.

It is also noted that "providing" in the sense of the present invention may include the inherent presence of the precursor (or compounds that may react to form the precursor) in the yarns, support material or both, for example due to in essence a biological process, for example the growth of an organism such as a plant.

The invention also pertains to a textile product comprising a pile of yarns bonded to a support material by using a bonding material that is in situ created by converting a provided reactive nucleus precursor into a compound having multiple reactive nuclei in the presence of a compound having multiple nucleophilic groups. The invention also pertains to a method to recycle a used textile product and to the use of polyphenols, in particular the use of the polyphenol lignin, in the production of a textile product.

DEFINITIONS

In this description and appended claims, the meaning of terms used to define the present invention and preferred embodiments thereof is as follows:

Yarn: a fibre or assembly of (preferably interlocked) fibres (of one material or a combination of multiple types of material), suitable for use in the production of textiles, e.g. by sewing, crocheting, knitting, weaving, embroidery etc. A yarn may be used in stretched (elongated) from, but also in helical from, entangled or any other form suitable to make a textile product.

Textile: any fabric or cloth made of yarns (of one type of material or a combination of multiple types of materials), being used e.g. for wearing apparel, household linens and bedding, upholstery, draperies and curtains, wall coverings, carpets (including rugs), book bindings etc.

Carpet. is a textile floor covering consisting of an upper layer of pile attached to a backing. The pile is generally made from wool, an artificial fibre or mixtures thereof such as wool and TENCEL™. Types of carpets are for example woven, needle felt, knotted or tufted. Tufted carpets have their pile injected into a backing material, which is itself then bonded to a secondary backing, often comprising a woven Hessian weave or a man made alternative to provide stability and durable attachment of the pile to the backing material. This is the most common method of manufacturing domestic carpets for floor covering purposes.

Reactive nucleus precursor any chemical compound, either of synthetic or natural origin that can be directly converted (i.e. not needing a reaction step via a stable intermediate compound) into a compound having a reactive nucleus, i.e. an atom, group or compound that attracts nucleophilic groups and tends to accept or share electrons. A reactive nucleus may for example be a reducing compound or a Lewis acid.

Nucleophilic group: an atom or group that contains an electron or electron pair available for bonding; in chemical reactions a nucleophilic group seeks a positive centre such as the nucleus of an atom or the positive end of a polar molecule or group.

Cellulose: an organic compound with the formula $(C_6H_{10}O_5)_n$, a polysaccharide consisting of a linear chain of several hundred to over ten thousand β(1→4) linked D-glucose units. Cellulose is the structural component of the primary cell wall of green plants (such as weeds, trees etc) and many forms of algae (e.g. seagrass). Cellulose is relatively inert but can be broken down into its glucose units by some bacteria, protozoans and fungi. Depending on the origin, cellulose based materials have different properties. Examples of extensively used fibres of cellulose of natural origin are flax (to make linen), jute, hemp, ramie, sisal and cotton.

Keratin: a material of a natural source having as a major component any one of a class of fibrous protein molecules of the type that serve as structural units for various living tissues such as hair, wool, nails, horn, hoofs, and the quills of feathers. These protein molecules generally contain large quantities of the sulphur-containing amino acids, particularly cysteine. The helical keratin molecules twist around each other to form elongated strands called intermediate filaments. The formation of a covalent chemical bond called a disulfide bridge between the sulphur atoms on two cysteins on separate polypeptide chains of keratin allows for the cross-linkage of these chains and results in a fairly rigid aggregate. Particular examples of keratin based fibres are wool, hair and silk.

Wool: a fibrous material consisting essentially of the protein keratin. The length of the fibres usually ranges from 3 to 40 centimeters depending on the animal source (sheep, camel, goat, rabbit, lama). Each fibre in the wool is made up of three essential components: the cuticle, the cortex, and the medulla. The cuticle is the outer layer. It is a protective layer of scales arranged like shingles or fish scales. When two fibres come in contact with each other, these scales tend to cling and stick to each other. It's this physical clinging and sticking that allows wool fibres to be spun into thread so easily. The cortex is the inner structure made up of millions of cigar-shaped cortical cells. In natural-coloured wool, these cells contain melanin. The arrangement of these cells is also responsible for the natural crimp unique to wool fibre. The medulla may comprise a series of cells (similar to honeycombs) that provide air spaces, giving wool its thermal insulation value. Wool, like residential insulation, is effective in reducing heat transfer.

Lignin: a polymer found in plant structures in association with cellulose. The structure of lignin is not well defined, but lignin appears to be made up of polymers of propylbenzene with hydroxy and methoxy groups attached. Lignin is primarily hydrocarbon in nature.

PREFERRED EMBODIMENTS

In an embodiment of the present invention, the reactive nucleus precursor is a quinone precursor. This is a precursor than can be converted into a quinone, i.e. an unsaturated cyclic diketone. Such precursor may be found among e.g. naphthalenes, heterocyclic aromatic compounds, phenolic compounds and polycyclic aromatic hydroquinones. A quinone inherently has two reactive carbonyl nuclei which are highly reactive to nucleophilic groups such as amines ($-NH_2$), thiols ($-SH$) and hydroxyl ($-OH$) groups. Reaction may lead to Schiff-base formation and 1,4 Michaels additions leading to polymer formation. It is known that quinones may react to form large polymers (from now on called "quinone polymers"), and at the same time, in the presence of a compound that has multiple (i.e. at least two) nucleophilic groups, may provide cross-links with these compounds.

In another embodiment the yarns comprise the compound having multiple nucleophilic groups. In this embodiment, the compound having multiple reactive nuclei may actually react with the yarns to form covalent bonds therewith. Such bonds may significantly improve the bonding between the yarns and the in situ formed polymer and hence the ultimate bonding strength between the yarns and the support. It is noted that this embodiment does not exclude the presence of nucleophilic groups in additional compounds such as the compound having multiple reactive nuclei itself, the support material and/or an externally applied compound.

In another embodiment the compound having multiple nucleophilic groups is a compound separate from the yarns and support material. In this embodiment a compound having multiple nucleophilic groups is added to the intermediate product in order to enable the in situ formation of an adequate polymer. This provides greater freedom in application of compounds having multiple nucleophilic groups, such as for example recycled wool, typically as a hydrolysate. It is noted that this embodiment does not exclude the presence of multiple nucleophilic groups, or a compound having such groups, in the yarns and or support material.

In yet another embodiment, the nucleophilic groups are amine groups. Applicant found that amine groups such as abundantly present in fibers used for carpet piles, viz. natural keratin based fibers such as wool, or synthetic fibers such as polyamide fibers (e.g. NYLON™) are very useful in the present invention. It appears that by using for example wool or polyamide for the yarns, the ultimate textile product may significantly exceed a bonding strength of 30N (3 kilo per yarn) which is generally accepted as adequate for a floor covering.

In a further embodiment, the support material comprises an additional compound having multiple nucleophilic groups. In this embodiment covalent bonds may be established between the in situ formed polymer and the support material, and thus between the yarns and the support material. Such covalent bonds may provide a superior bonding strength between the yarns and the support material when compared to prior art methods where the yarns are bonded to the support material using Van der Waals forces (viz. the mere embedding of the yarns and support material in a layer of latex, polymer or hot melt adhesive). The support material in this embodiment may comprise a compound that inherently has multiple nucleophilic groups such as polyamide, but may for example also be (chemically) modified to contain such groups. An example of such a material is amine modified cellulose (so-called aminated cellulose).

In another embodiment, the quinone precursor is a phenolic compound (i.e. a compound having an $-OH$ or $-OCH_3$ group attached to an aromatic nucleus). Applicant recognised that phenolic compounds can be easily directly converted into quinones without needing complicated chemistry, relying merely on easy to perform oxidation reactions. This may improve the economic advantages of the present method.

In a further embodiment the phenolic compound is a polyphenol of natural origin, preferably, but not necessarily, chosen from the group consisting of lignins, tannins, saponins and catechols. These compounds are known to be good precursors of e.g. quinones (which have at least two reactive nuclei). A very important advantage of this embodiment is that such compounds are inherently present in many natural materials that can be used for producing a textile product. Such polyphenols can be found e.g. in flax, jute, hemp, ramie.

This provides the advantage that the application of an externally applied reactive nucleus pre-cursor may be dispensed with.

In this embodiment, given the fact that the precursor is of natural origin, less synthetic resources are needed which leads to a more environmentally friendly textile product. Also, ultimate recycling of the textile product may be virtually complete since such compounds may be completely biologically degradable, making this embodiment far more advantageous than the prior art methods relying on non or very hardly biodegradable latex, polymers and hot melt adhesives. With respect to this further embodiment, it is noted that polyphenols are characterized by the presence of large multiples of phenol substructures, the number and characteristics of which underlie the physical, chemical, and biologic (metabolic, toxic, therapeutic, etc.) properties of particular members of the class of polyphenols. Polyphenols of natural origin include plant polyphenols, i.e polyphenols derived from plants, in particular from the woody tissue of plants. The term polyphenol does not necessarily indicate that they are a type of polymer. In particular in the plant polyphenols, there is often no continuous molecular structure of repeating monomeric structures, though in some molecules such as tannic acid and in the condensed tannins, particular phenolic units appear repeatedly. The prime example of a plant polyphenol is lignin that can be found i.a. in the woody tissue of gymnosperms. Lignin is the most abundant plant polyphenol and is formed from radical-mediated cross-linking of simple phenolics derived from the plant phenylpropanoid pathway. Other examples of plant polyphenols can be found among the saponins, catechols, stilbenoids, flavonoids etc. Lignin however is the most abundant plant polyphenol and commonly recognized as being a renewable resource with a huge potential use in that respect. Worldwide more than 50 million tons of lignin is being produced annually as residue in paper production processes. Despite interesting functionalities and properties of lignin however, most of it is simply burned to generate energy for the pulp mills. Added value applications in renewable products have been searched for several decades already. Examples of such applications are the use of lignin as a dispersants for polyester dyes or agricultural chemicals or the use as an emulsifier and/or additive in asphalt. Other applications are the use in phenolic resins, polyurethane foams and for constituting carbon fibres or as binders for wood pellets. Despite these alternative uses being technically available, most lignin is still being used as a mere fuel. When using lignin as a precursor according to the present invention, a commercially attractive alternative for serving as a mere fuel is provided.

In a further embodiment the phenolic compound is enzymatically converted. Applicant recognised that (poly)phenolic compounds of natural origin, although known to be very stable and indigestible by animal enzymes, are susceptible to enzymatic conversion by a variety of enzymes to form reactive nuclei. Such enzymes are for example enzymes produced by some bacteria or fungi such as lignin peroxidase (from the white-rot fungus *Phanerochaete chrysosporium*) manganese peroxidase, laccase or cellobiose dehydrogenase. Applicant recognised that enzymatic conversion inherently goes together with the formation of reactive nuclei at some stage. The use of enzymes not only contributes to easy conversion of the precursor into a quinone, but is also very advantageous for recycling the ultimate textile product: no synthetic reactants are needed and all applied components of the bonding constituents may be completely biodegradable. In particular in combination with yarns and a support material that both consist of biodegradable materials, such as biodegradable polymers, this embodiment may lead to a 100% recyclable textile product, e.g. through natural decomposition. With regard to the latter, it is preferred that the yarns comprise keratin fibres, and that the support material comprises cellulose fibres of natural origin. Also, applicant recognised that keratin fibres comprise many nucleophilic groups such as amines ($-NH_2$), thiols ($-SH$) and hydroxyl ($-OH$) groups. Applicant found that these nucleophilic groups in the keratin fibres can react with these reactive nuclei of the said phenolic compounds present in concurrence with the cellulose fibres, to obtain covalent bonds that provide sufficient mechanical bonding (mechanical coupling) between the (keratin containing) yarns and the (cellulose containing) backing. In this embodiment, the invention can be defined as a method for providing a textile product comprising taking yarns comprising keratin fibres, attaching the yarns to a support material comprising cellulose fibres of natural origin to form an intermediate product and bonding the yarns to the support material to form the textile product, characterised in that the bonding takes place by enzymatic treatment of the intermediate product.

In an embodiment the keratin based material is wool, which is attached to a support comprising linen by tufting. This embodiment provides a textile product that is ideally suitable as a carpet or other floor covering. Wool may provide an appealing carpet with excellent durability, a good feel, comfortable in daily use, sufficient flame retardancy, repellent and anti-static properties, whereas the linen backing may provide sufficient mechanical stability while retaining a high flexibility.

It is noted that it is known in the art to covalently bind phenolic molecules to wool, for example as described by Hossain, Kh. M. G. et al. in *Journal of Biotechnology*, 141 (2009), 58-63 and in *Enzyme and Microbial Technology*, 46 (2010), 326-330. However, it is not known from these references that yarns can be mechanically bonded to a support material using enzymatically converted phenolic compounds. It is also noted that cellulose fibre reinforced keratin composites are known in the art, for example as mentioned in the article "Novel Biocomposites with Feather Keratin" by Krystina Wrzesniewska-Tosik et al. as published in *FIBRES & TEXTILES in Eastern Europe*, January/December 2007, Vol. 15, No 5-6 (64-65). However, in such composites the cellulose and keratin fibres are not bonded through enzymatic treatment.

In a further embodiment, the compound having multiple nucleophilic groups is dispensed with. Applicant recognised that enzymatic conversion of polyphenolic compounds not only goes together with the formation of quinones at some stage, but also the formation of reactive radicals that can polymerize even in the absence of an additional compound having nucleophilic groups. This is in line with publicly available knowledge, such as for example described by Blanco et al. in *Enzyme and Microbial Technology*, 44 (2009), 380-385 and Aktas et al. in the *Journal of Molecular Catalysis B: Enzymatic* 856 (2003) 1-9. This means that the current method can be applied when using yarns and a support material that are absent of nucleophilic groups, without even providing an external compound having multiple nucleophilic groups, leading to less process steps and thus potentially to an economically more attractive textile producing method. From the Blanco reference it is also known that other compounds such as amines can be enzymatically converted to form polymer materials. Therefore, in an other embodiment, instead of or in addition to the phenolic compound an amine is used for enzymatic conversion.

In a preferred embodiment the enzyme is an oxidoreductase, i.e. an enzyme that catalyzes the transfer of electrons from an electron donor (also called hydrogen donor or reductant) to an electron acceptor (also called hydrogen acceptor or oxidant). Applicant recognised that phenol groups are extremely susceptible for conversion into reactive nuclei by using an oxidoreductase (also simply called oxidase or dehydrogenase). Indeed, substantially all natural processes pertaining to the formation and biodegradation of (poly-)phenolic compounds such as tannins and lignins are catalyzed by a variety of oxidoreductases. Particularly useful are phenol oxidases, in particular those classified under EC 1.10 (oxidoreductases acting on diphenols and related substances as donors), which are oxidases employing molecular oxygen as acceptor, i.e. enzymes catalyzing oxidation reactions in which molecular oxygen functions as oxidizing agent. Laccases are very suitable oxidases in the context of the invention. Examples of other oxidases which may be particularly useful in the present invention include the catechol oxidases and ubiquinol oxidases.

Laccases are obtainable from a variety of microbial sources, notably bacteria and fungi (including filamentous fungi and yeasts), and suitable examples of laccases are to be found among those obtainable from fungi, including laccases obtainable from strains of *Aspergillus, Neurospora* (e.g. *N. crassa*), *Podospora, Botrytis, Collybia, Fomes, Lentinus, Pleurotus, Trametes, Polyporus, Rhizoctonia* (e.g. *R. solani*), *Coprinus* (e.g. *C. plicatilis*), *P. satyrella, Myceliophthora* (e.g. *M. thermophila*), *Schytaldium, Phlebia* (e.g. *P. radita*), *Coriolus* (e.g. *C. hirsutus*), *Pyricularia* or *Rigidoporus*.

The enzymatic treatment may take place in the presence of a monomeric phenolic compound. A monomeric compound in this sense means a compound which consists of single molecules, in essence all of the same weight, thus not being a compound comprising long chain molecules of varying weight, of which merely the mean weight is used to classify the compound (such as in the case with polymeric compounds). A monomeric compound may thus be the reaction product of multiple molecules, as long as the resulting molecules are (virtually) all of the same weight. By treating the intermediate product in the presence of a monomeric phenolic compound, such a compound can be used to modify the keratin fibres by grafting the compound on the surface of the fibre. Phenolic compounds are known that may provide self-cleaning, flame retardance, antimicrobial and antioxidant properties. Such compounds may for example be nordihydroguaiaretic acid as described in the *Journal of Biotechnology,* 141 (2009), 58-63 or lauryl gallate as described in *Enzyme and Microbial Technology,* 46 (2010), 326-330, both references mentioned supra.

In a further embodiment the enzyme is applied before an external phenolic compound is applied. In this embodiment the enzyme is applied in the method in an early stage, for example right after the intermediate product has been established, whereafter an external phenolic compound, e.g. a paste comprising lignin, is applied (in addition to or instead of a phenolic compound being optionally present in the yarns and/or support material). This way it may be ensured that the enzyme is present actually at the site where the yarns contact the support material such that the conversion of the quinone precursor into a quinone really takes place where the actual bonding between the yarns and support material has to take effect.

In an embodiment the precursor is coated onto the intermediate product. It appears to be more convenient to apply the precursor to the intermediate product than to apply it before this product has been established. If done before, for example by coating the precursor on the support material, the properties of the support material may deviate significantly from regular support material, making it difficult to establish the intermediate product using conventional apparatus such as commercially available tufting machinery. It is therefore preferred to establish the intermediate product using any art known method, and any art known materials, and only thereafter apply the quinone precursor to the intermediate product.

In an embodiment, the support material is a fibrous support material. Such a support material makes it easy to apply commonly known methods to establish a textile product, in particular a floor covering, in particular using tufting to contact the yarns to the support material. Tufting has proven to be a very adequate way of initial attachment of the wool yarns to the backing, allowing sufficient contact between the yarns and the support material to allow bonding according to the present invention. In a preferred embodiment the yarns form a cut or looped pile on the support.

In a further embodiment the support material is a woven fabric, comprising fibres of synthetic or natural origin. Polyethylene, polyamide (such as NYLON™), cotton, jute, rayon, lyocell (such as TENCEL™), hemp and ramie may be advantageously used as fibres to constitute a fibrous, preferably woven, support material. TENCEL™ can also be advantageously used to constitute the yarns.

Given the finding as described here-above, namely that the current method can be applied when using yarns and a support material that are absent of nucleophilic groups, without providing an external compound having multiple nucleophilic groups, and the fact that it was surprisingly found that this can be done without needing pressure or elevated temperatures, applicant recognised that the current invention also has its optional application in the use of polyphenols of natural origin, in particular lignins, that after enzymatic conversion are used to in situ form a polymer glue to mechanically bond a textile product to a stable surface such as for example a floor of concrete, ceramics or wood.

The present invention also enables a method for recycling a used textile product, and also provides a new substrate for growing plants using this recycling method. In particular, the embodiment wherein yarns are used comprising keratin fibres and a support material comprising cellulose fibres enables the new method. The keratin fibre and cellulose fibre materials can be collected as one waste stream and may be used as a substrate for growing plants, since keratin fibres are very suitable for retaining moisture, while the cellulose fibres can be used as a source of nutrition for plants. The non-presence of a non-biodegradable adhesive such as a latex, enables a simple method of bringing the textile product in a form suitable for use in a substrate to grow plants (e.g. by cutting, shredding etc).

In an embodiment the used textile product is mechanically cut in parts having a mean diameter of 5 cm or less. Applicant found that mechanical cutting of the enzymatically bonded textile product, although very simple and cheap, is sufficient to bring the product in a form for use in a substrate to grow plants. The pieces of 5 cm diameter or less can be used a such, for example to mix with soil in situ, or can be pre-mixed with soil, seeds, other nutrients, stabilisers etc. to produce a ready-made substrate.

In another embodiment, the used textile product is felted. By felting the product, a light-weight new fabric can be created that is ideally suitable, if not cut into pieces, for use as a land-scaping substrate (also known as geo-textile), optionally when combined with seeds, soil, nutrients fillers etc. Still, cutting the product into smaller pieces is also an option, depending on the required properties of the substrate to be formed with the felted textile.

In yet another embodiment the textile product is attached to a backing material, wherein the backing material is detached before the textile product is brought in a form suitable for use in a substrate. For some (mainly high-end) applications a backing material may be a necessity to provide the required mechanical stability for the textile product. To ensure optimal use of the present invention, it was found that detaching the backing material before the textile product is brought in a form suitable for use in a substrate is advantageous. In a further embodiment the backing is attached to the textile product with a thermally reversible adhesive, wherein that the backing is detached by heating the adhesive above it's melting point. This has been found to be a simple route towards adequate recycling of the textile product itself.

The present invention also enables a method that provides an economically attractive high end application of lignin, which method is an alternative for the burning of lignin as a fuel, and comprises the steps of taking a plant having lignin in its structure, pulping the plant, isolating lignin from the pulp, and providing the lignin as a binder precursor for use in a method to produce a textile product. This textile producing method comprises the steps of providing yarns, contacting the yarns with a support material to form an intermediate product and bonding the yarns to the support material to form the textile product, wherein the bonding takes place by applying the lignin at a site where the yarns contact the support material, followed by enzymatically converting the lignin into a binder that bonds the yarns to the support. In this method, firstly lignin is isolated from plant material. Several different enzymatic, chemical and mechanical methods have been developed for the isolation of lignin from plants (wood or non-wood). Commonly employed methods for isolating lignin rely on a first step wherein the plants are pulped. The process of pulping is commonly known in the art and usually performed at a pulp mill which is a manufacturing facility that converts wood chips or other plant fibre source. Pulp can be manufactured using mechanical, semi-chemical or fully chemical methods (e.g. kraft and sulfite processes). The finished product may be either bleached or non-bleached, depending on the customer requirements. Wood and other plant materials used to make pulp contain three main components (and may optionally comprise water or another solvent): cellulose fibres (desired for papermaking), lignin and hemicelluloses. The aim of pulping is merely to break down the bulk structure of the fibre source, be it chips, stems or other plant parts, into the constituent fibres. From the resulting pulp, lignin can be isolated using various art known methods. A common method is to extract the lignin with neutral solvents, either with or without the concurrent use of a catalyst, to ensure that the chemical structure of the lignin is unaltered. Another method is based on the enzymatic hydrolysis of the cellulose, leaving the lignin behind as an insoluble residue (Yamasaki et al: Characterization of Residual Lignin in Pulp; In *Proceedings of the International Symposium on Wood and Pulping Chemistry*. Stockholm, Sweden, pp 34-42, 1981). With both these methods residual lignin needs to be purified to remove e.g. residual carbohydrates and/or protein impurities. A method that needs less or no additional purification after the lignin isolation step, is the acid hydrolysis process. In this method, prior to the actual lignin isolation, pulps are extracted with a liquid, typically with acetone. The extracted pulp is then refluxed under an inert atmosphere (i.e., nitrogen or argon) typically with 0.1 M HCl in 9:1 dioxane:water. The solubilized lignin is then recovered from the solution. In the end, the isolated lignin may be provided as a reactive nucleus precursor for use in a textile producing method according to the invention.

In a preferred embodiment the steps that lead to the provision of lignin as a binder precursor are performed at a first site, which first site is remote from a second site where the textile producing method takes place. Applicant recognised that lignin isolation typically takes place in an existing industry linked to paper production, which is completely different from the industry linked to textile production, in particular the industry that produces floor coverings. The present invention can thus be advantageously applied at a first site where the lignin is isolated, and sold for example to another party that at a remote site produces floor coverings or other textile products. This obviates the immediate application of the present invention, without needing to create new combined production facilities.

EXAMPLES

The invention will now be illustrated in more detail using the following non limiting examples:

Example 1 describes the provision of an intermediate textile product, made from yarns comprising keratin fibres (wool), attached to a support material comprising cellulose fibres (linen and cotton).

Example 2 describes a method according to the present invention.

Example 3 describes a second method according to the invention, using the quinone precursors that are naturally present in linen and cotton.

Example 4 describes a third method according to the invention using a second type of enzyme.

Example 5 describes a fourth method according to the invention using yet another type of enzyme.

Example 6 describes a fifth method according to the invention.

Example 7 gives methods how to bring a textile product in a form suitable for use in a substrate.

Example 1

Firstly a tufted intermediate product of wool (comprising multiple nucleophilic groups, in particular amine groups) and a linen/cotton backing is made. Tufting is a type of textile weaving in which a thread is attached to a primary base by mere insertion on that base. It is a commonly known technique (common tufting processes are described La. in EP 0 609 385, EP 0 837 170 and WO 93/07790), comprising knitting yarns into a two-dimensional support, whereafter short U-shaped loops of extra yarn may be introduced through the resulting fabric from the outside so that their ends point inwards. Usually, the tuft yarns form a regular array of "dots" on the outside. On the inside, the tuft yarns may be tied for security, although they need not be. The ends of the tuft yarns may then frayed, so that they will subsequently felt to from a dense insulating and shock absorbing layer. The tufting process leads to a semi-finished product, whereby the loose ends of the threads form the ultimate contact surface. At the reverse side, the threads need to be bonded to the base, since otherwise the threads can be removed from the carpet by applying a very light (pulling) force. The mere attachment of the threads namely is purely based on friction between the threads of the surface layer and the backing. In the prior art, bonding (whereafter additional forces than mere friction between the threads themselves are provided) is commonly done by applying a layer of latex, rubber or hot melt glue (to apply additional frictional forces, vandenNaals forces and/or covalent forces).

In the present case, the support is made from cotton and linen. The cotton yarn (Nm 40.0/2) is used as a warp (114 threads per dm), the linen yarn (Nm 7.5/1) is used as a weft (87 threads per dm). This way a piece of textile support is made having a density of 182 g/m². The wool is a two-yarn thread (Nm 1.75/2 s/z). The wool was tufted on the support using a ⅛" cut-pile machine, leading to a tufted wool weight of 1350 g/m² (any value between 600 and 2600 is typical for a wool floor covering) with a pile height of 13 mm. The number of piles is 100.170 per dm². The resulting product is an intermediate product, wherein the wool piles are simply tufted into the linen/cotton support, but not bonded thereto: the piles can be manually removed from the support by applying a very slight pulling force.

Example 2

In this example, firstly a laccase solution was made consisting of a 0.1 M sodium acetate/acetic acid buffer (pH 5), to which buffer was added laccase (EC 1.10.3.2 *Trametes* sp. laccase, Laccase L603P from Biocatalysts Ltd; 0.125 g prot. per g solid) to reach a concentration of 0.003 gram protein/ml. Also prepared were two pastes containing reactive nucleus precursors, in this case quinone precursors. Each paste comprised approximately 1 gram of each respective precursor, dispersed in 2 ml of 0.1 M sodium acetate/acetic acid buffer (pH 5). The first paste (A) contained saponin (CAS 8047-15-2 from Sigma-Aldrich), tannic acid (CAS 1401-55-4 from Sigma-Aldrich) and 4-tert-butylcatechol (CAS 98-29-3 from Sigma-Aldrich) and the second paste (B), saponin (CAS 8047-15-2 from Sigma-Aldrich), lignin (CAS 8068-05-1, Mw 10 000, alkali, low sulfonate content from Sigma-Aldrich) and 4-tert-butylcatechol (CAS 98-29-3 from Sigma-Aldrich).

Two samples of approximately 100 cm² were cut out of an intermediate product made in line with Example 1. The back sides (support material side) were each sprayed with the laccase solution (about 50 ml/m²) and thereafter coated with 4 ml of the respective pastes A and B. The samples were incubated at 45° C. for four hours to enzymatically convert the precursors in quinones and reactive radicals, and allow polymerization and reaction with the nucleophilic groups present in the yarns. Chemical reaction with the support material was not expected. Thereafter the samples were dried for one hour at 90° C. at atmospheric pressure.

After drying, it appeared that for both samples, the pile could withstand a force of approximately 5 kg before being pulled out of the support material. In the art of floor coverings, it is regarded adequate when a pile can withstand a force of 3 kg before being pulled out of the backing in the same test method. It has thus been proven that adequate mechanical bonding between yarns and a support material can be provided with a method according to the current invention. Please note that this is even the case in this example where there is no covalent bonding expected between the quinone polymer and the support material. This is a good indication that also in the absence of covalent bonding between the yarns and the quinone polymer adequate bonding may be obtained.

This example was repeated with an incubation time of 30 minutes instead of 4 hours to assess whether sufficient enzymatic conversion could be reached in such a short time. Indeed, after a 15 minutes drying period at 95° C., a strong bonding effect was noticed.

Example 3

This is an example wherein the reactive nucleus precursor is present in the yarns of the support material (due the biological process of growth of the plant), viz. in the form of the natural polyphenol lignin being present in cellulose fibres. It is shown that actual bonding can be established by enzymatically converting the precursor lignin into a quinone (having multiple reactive nuclei) and a compound having multiple nucleophilic groups, viz. wool, which inherently has abundant amine groups.

Multiple samples of the textile product made according to Example 1 (in each case a sample of about 4 grams) were incubated in 0.1 M sodium acetate/acetic acid buffer (pH 5) at 45° C., to which buffer was added 0.1% w/v laccase (EC 1.10.3.2 *Trametes* sp. laccase, Laccase L603P from Biocatalysts Ltd; 0.125 g prot. per g solid), 12.9 g/l lignosulfonic acid sodium salt (Mw 52 000; from Sigma-Aldrich) and 11.5 g/l hexamethylenetetramine (Sigma-Aldrich) and 12.5 g/l catechol (CAS 120-80-9 from Sigma-Aldrich). The following incubating times were used:

TABLE 1

| Sample No | Incubating time (hours) |
| --- | --- |
| 1 | 1 |
| 2 | 4 |
| 3 | 8 |
| 4 | 24 |
| 5 | 48 |

After incubation, the samples were washed with tap water, followed by drying under normal room conditions (room temperature, 1 atm).

It appeared that in all cases, the wool piles were bonded to the support. Before the enzymatic treatment, wool piles could be manually removed by applying a very light pulling force. After the treatment, piles could only be removed by applying significantly more force, indicating that additional bonding forces (with respect to mere friction forces between the wool and support) have been provided by the enzymatic treatment. The sample which was incubated during 48 hours appeared to have the strongest bonding between the wool and linen/cotton support.

In this example it is shown that actual bonding can be established between a quinone present in the support materials fibres (i.e. enzymatically converted lignin) and a compound having multiple nucleophilic groups in the pile yarns (i.e wool having amine groups) even at a temperature as low as 45° C.

Example 4

In this example, firstly a tyrosinase (EC 1.14.18.1 *Agaricus bisporus* tyrosinase, a tyrosinase from mushroom, available from Sigma; 1.000 units per mg solid) solution was made consisting of a 0.1 M sodium acetate/acetic acid buffer (pH 6), to which buffer was added to reach a concentration of 2000 units/ml. Also prepared was a paste containing reactive nucleus precursors, in this case quinone precursors. The paste comprised approximately 1 gram of each respective precursor, dispersed in 2 ml of 0.1 M sodium acetate/acetic acid buffer (pH 6). The paste contained saponin (CAS 8047-15-2 from Sigma-Aldrich), tannic acid (CAS 1401-55-4 from Sigma-Aldrich) and 4-tert-butylcatechol (CAS 98-29-3 from Sigma-Aldrich).

A sample of approximately 100 cm² was cut out of an intermediate product made in line with Example 1. The back sides (support material side) were each sprayed with the tyrosinase solution (about 50 ml/m²) and thereafter coated with 4 ml of the paste. The samples were incubated at 45° C. for four hours to enzymatically convert the precursors in quinones and reactive radicals, and allow polymerization and reaction with the nucleophilic groups present in the yarns. Chemical reaction with the support material was not expected. Thereafter the samples were dried for half an hour at 125° C. at atmospheric pressure. After drying, it appeared that for the sample, the pile could withstand a force of approximately 5 kg before being pulled out of the support material.

A comparable strong bonding could be reached with an incubation time of 30 minutes at 45° C., and drying for 15 minutes at 95°.

Example 5

In this example, firstly a peroxidase (EC 1.11.1.7 *Amoracia rusticana* peroxidase, peroxidase from horseradish, Sigma Type VI-A from Sigma; 1.000 units per mg solid) solution was made consisting of a 0.1 M sodium acetate/acetic acid buffer (pH 6), to which buffer was added to reach a concentration of 2000 units/ml. Also prepared was a paste containing reactive nucleus precursors, in this case quinone precursors and hydrogen peroxide. The paste comprised approximately 1 gram of each respective precursor, dispersed in 2 ml of 3% $H_2O_2$ solution in acetate/acetic acid buffer (pH 6). The paste contained saponin (CAS 8047-15-2 from Sigma-Aldrich), tannic acid (CAS 1401-55-4 from Sigma-Aldrich) and 4-tert-butylcatechol (CAS 98-29-3 from Sigma-Aldrich).

A sample of approximately 100 $cm^2$ was cut out of an intermediate product made in line with Example 1. The back sides (support material side) were each sprayed with the peroxidase solution (about 50 $ml/m^2$) and thereafter coated with 4 ml of the paste. The samples were incubated at 45° C. for four hours to enzymatically convert the precursors in quinones and reactive radicals, and allow polymerization and reaction with the nucleophilic groups present in the yarns. Chemical reaction with the support material was not expected. Thereafter the samples were dried for half an hour at 125° C. at atmospheric pressure. After drying, it appeared that for the sample, the pile could withstand a force of approximately 5 kg before being pulled out of the support material.

Example 6

This example shows a virtually complete closed-loop method of producing a textile product. In this method, waste wool (washed, dyed and spun) is used as a (external) provider of nucleophilic groups to be used in the in situ polymerization process to bond tufted yarns to a support material.

Firstly a laccase solution was made consisting of a 0.1 M sodium acetate/acetic acid buffer (pH 5), to which buffer was added laccase (EC 1.10.3.2 *Trametes* sp. laccase, Laccase L603P from Biocatalysts Ltd; 0.125 g prot. per g solid) to reach a concentration of 0.003 gram protein/ml. Also prepared were two pastes containing reactive nucleus precursors, in this case quinone precursors i.e. tannic acid or lignin, and a nuclephilic group provider i.e. wool hydrolysate. Wool hydrolysate was produced by proteolysis of wool wastes with a protease (EC 3.4.21.62 *Bacillus* sp. protease, Esperase 8.0 L from Novozymes Corp.; 10% protein content). Ten grams of wool and 0.2 g of enzyme protein were placed in one liter of 0.1 M phosphate buffer (pH 8) at 50° C. overnight under mechanical stirring. After filtering, the solid fraction of the wool hydrolysate was dried and used in pastes preparation. Each paste comprised approximately 0.05 gram of the wool hydrolysate, 0.25 gram of saponin (CAS 8047-15-2 from Sigma-Aldrich) and 0.75 gram of the respective quinone precursor, tannic acid (CAS 1401-55-4 from Sigma-Aldrich) in paste (A) or lignin (Hardwood lignin, MW 5900 Da, DP401 from Borregard) in paste (B). To each paste 1 mL of the laccase solution was added. Two samples of approximately 100 $cm^2$ were cut out of an intermediate product made in line with Example 1. The back sides (support material side) were each sprayed with the laccase solution (about 50 $ml/m^2$) and thereafter coated with 4 ml of the respective pastes A and B. The samples were incubated at 45° C. for 30 min to enzymatically convert the precursors in quinones and reactive radicals, and allow polymerization and reaction with the nucleophilic groups present in the yarns. Chemical reaction with the support material was not expected. Thereafter the samples were cured for 15 minutes at 95° C. at atmospheric pressure. After drying, it appeared that for both samples, the pile could withstand a force of approximately 3.5 kg before being pulled out of the support material.

Example 7

The textile products made in line with any of the examples 3 to 6, are shredded into pieces of about 0.5 cm in diameter. These pieces are mixed with regular soil (30/70 w/w) to provide a substrate for the growth of plants. This substrate retains water to a better extent and also, is richer in nutrients when compared to the soil as such. This gives rise to better growth of plants, either in commercial or non-commercial culture of plants.

In an alternative experiment, a textile product made according to any of the examples 3 to 6, having dimensions of about 4×8 meters (w×l), is felted. Grass seeds are added to the felted textile. After that, the textile is draped over regular soil in the open air, and about 0.5 cm of soil is spread over the felted textile, now serving as a substrate. Next to this textile is a piece of open land, having the same dimensions. The same seeds are sown (to the same density) in this piece of land and covered with about 0.5 cm of the same soil. Both areas are watered right after sowing and then left as they are. The growth of the grass is monitored daily. The felted textile may provide faster and denser growth of the grass.

What is claimed is:

1. A method for producing a textile product comprising the steps of:
   providing yarns,
   contacting the yarns with a support material to form an intermediate product and
   bonding the yarns to the support material to form the textile product, said step of bonding including the steps of:
   providing a reactive nucleus precursor at a site where the yarns contact the support material, and
   converting the precursor into a compound having multiple reactive nuclei in the presence of a compound having multiple nucleophilic groups.

2. A method according to claim 1, wherein the reactive nucleus precursor is a quinone precursor.

3. A method according to claim 2, wherein the quinone precursor is a phenolic compound.

4. A method according to claim 3, wherein the phenolic compound is a polyphenol of natural origin, selected from the group consisting of lignins, tannins, saponins and catechols.

5. A method according to claim 4, wherein the step of bonding further includes the step of enzymatically converting the phenolic compound with an enzyme.

6. A method according to claim 5, wherein an amine is used for enzymatic conversion:
   instead of or
   in addition to
the phenolic compound.

7. A method according to claim 5, wherein the enzyme used is an oxidoreductase.

8. A method according to claim 7, wherein the enzyme is a phenol oxidase.

9. A method according to claim 8, wherein the enzyme is a laccase.

10. A method according to claim 5, wherein the enzyme used is applied before an external phenolic compound is applied.

11. A method according to claim 4, wherein the yarns comprise keratin fibres, and the support material comprises cellulose fibres of natural origin.

12. A method according to claim 11, wherein the keratin fibres include wool, which is attached to a support comprising linen by tufting.

13. A method according to claim 1, wherein the yarns comprise the compound having multiple nucleophilic groups.

14. A method according to claim 13, wherein the support material comprises an additional compound having multiple nucleophilic groups.

15. A method according to claim 1, wherein the compound having multiple nucleophilic groups is a compound separate from the yarns and support material.

16. A method according to claim 1, wherein the nucleophilic groups are amine groups.

17. Method that provides an alternative for the burning of lignin as a fuel, comprising the steps of:
   taking a plant having lignin in its structure,
   pulping the plant,
   isolating lignin from the pulp, and
   providing the lignin as a binder precursor for use in a method to produce a textile product,
   providing yarns,
   contacting the yarns with a support material to form an intermediate product and
   bonding the yarns to the support material to form the textile product, wherein the bonding includes the steps of:
      applying the lignin at a site where the yarns contact the support material,
      followed by enzymatically converting the lignin into a binder that bonds the yarns to the support.

\* \* \* \* \*